Dec. 4, 1945. M. RACZ 2,390,461
BLOCKADE DEVICE
Filed March 20, 1944
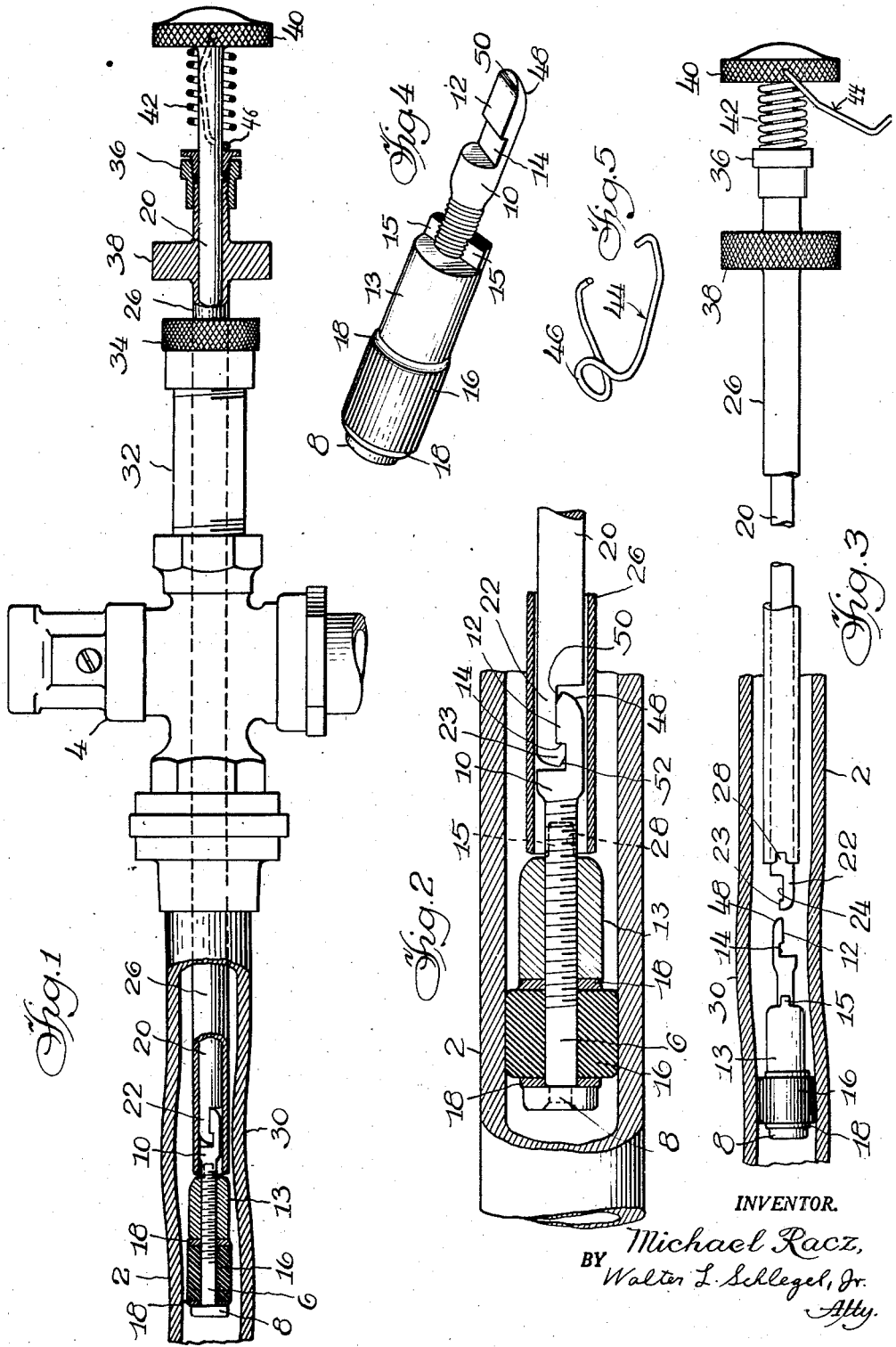
INVENTOR.
Michael Racz,
BY Walter L. Schlegel, Jr.
Atty.

Patented Dec. 4, 1945

2,390,461

UNITED STATES PATENT OFFICE 2,390,461

BLOCKADE DEVICE

Michael Racz, East Chicago, Ind.

Application March 20, 1944, Serial No. 527,299

19 Claims. (Cl. 138—89)

My invention relates to blockade or stopper devices for conduits and more particularly to a device for blockading a pipe line carrying fluid under pressure.

The general object of my invention is to design a stopper device comprising a plug assembly which may be inserted by the operator ahead of a leak in the pipe line or a defective valve connected thereto and which may be expanded by the operator to positively restrain fluid from passing beyond the plug assembly. The assembly is actuated by a mechanism readily engageable and disengageable therewith, whereby after the plug assembly has been expanded, said actuating mechanism may be removed from the pipe line to facilitate the necessary repairs; and thereafter said mechanism may be reinserted into the pipe line to contract and remove the plug assembly to a point beyond the valve, so that the latter may be closed before removal of the device.

Another object of my invention is to provide a novel connection between the plug assembly and its actuating mechanism affording a limited amount of relative angling therebetween to permit the insertion of the plug assembly beyond a slight bend in the pipe line, such as may frequently occur therein.

Still another object of my invention is to design a novel coupling between the plug assembly and its actuating mechanism which will readily accommodate engagement and disengagement therebetween.

In the drawing,

Figure 1 is a side elevation of a pipe line and valve with my novel stopper device applied thereto, the plug assembly being shown in contracted position and in coupled relationship with its actuating mechanism, portions of the structure being shown in section to clarify the illustration.

Figure 2 is an enlarged fragmentary view similar to Figure 1 and showing the inner extremity of the stopper device, with the plug assembly in expanded position.

Figure 3 is a sectional view through the pipe line showing the stopper device in elevation, with the plug assembly expanded and disengaged from its actuating mechanism.

Figure 4 is a perspective view of the plug assembly.

Figure 5 is a perspective view of the index and lock member for the coupler rod.

Describing my invention in detail, my novel stopper device is illustrated as applied to a pipe line 2, which may be provided with a valve 4 of conventional design.

The plug assembly may comprise a rod 6 with an abutment member 8 carried by one end thereof, and said rod may be formed on its opposite end with a coupling member 10 of hooklike form which may comprise a lug or tongue 12 (Fig. 2) on its outer extremity defining the slot or groove 14 extending transversely of the member 10. It will be understood that the abutment member 8 may be removably connected to the rod 6 or may be made integral therewith, as by welding or rivetting; however, in either case, the abutment member is so secured to the rod as to be fixed against axial movement with respect thereto.

A movable abutment member or compressor nut 13 may be threaded on the rod 6 and may comprise the lugs or tongues 15, 15 formed and arranged for complementary interlocking engagement with the rotor tube hereinafter described. A resilient, expansible plug 16 may be snugly sleeved on the rod 6 intermediate the abutment members 8 and 13, and washers 18, 18 may be interposed between the members 8 and 13 and the plug 16 to reduce abrasion thereof during expansion and contraction thereof. It will be understood that, if desired, the washers may be eliminated, and the abutment members may bear directly against the plug.

The actuating mechanism for the plug assembly may comprise a coupler rod 20 with a hooklike coupling member 22 on its inner extremity, and said member 22 may comprise a lug or tongue 23 received within the groove 14 and defining a groove or slot 24 (Fig. 3) receiving the tongue 12, and it may be noted that each of the tongues 12 and 23 may present a flat bearing surface for complementary engagement with a flat surface within the recess of the other coupling member. A rotor sleeve or tube 26 may be sleeved over the rod 20 and may comprise the spaced slots 28, 28 receiving the lugs 15, 15 on the compressor nut 13, said tube 26 serving to maintain the coupling members 10 and 22 in coupled relationship in what may be described as a tongue and groove connection as seen in Figures 1 and 2. It may be noted, at this point, that the engagement between the rotor tube and the compressor nut 13, and the bayonet connection between the coupling members 10 and 22 may be sufficiently loose to permit limited angling of the plug assembly relative to the rod 20 and the rotor tube, thus permitting the assembly to be inserted beyond a slight bend in the pipe line which may occur as at 30 (Figures 1 and 3).

The stopper device may be connected to the valve 4 by means of a pipe 32 sleeved over the rotor tube 26 in threaded engagement with the valve, and said pipe may be provided with a packing gland 34 to prevent the escape of pressure fluid from between the pipe 32 and the tube 26. A packing gland 36 may also be provided on the outer end of the tube 26 to prevent escape of fluid from between said tube and the rod 20.

A handle 38 may be integrally formed on or secured in any convenient manner to the tube 26 for rotating the same, and said rod 20 may be provided with a handle 40 for preventing rotation thereof, said handle affording a seat for one end of a coil spring 42, which may be sleeved over the rod 20 for engagement with the packing gland 36 to yieldingly maintain the rotor tube 26 in sleeved relationship with the members 10 and 22, thus maintaining the tongue and groove connection therebetween.

A combination lock and index member 44 in the form of a bent wire may be pivoted to the handle 40, and said member 44 may be formed with a loop, i. e., U-shaped portion 46 which may embrace the rod 20 and may abut the packing gland 36 (Fig. 1) to positively lock the rotor tube 26 in engagement with the compressor nut 13. Furthermore, the loop 46 facilitates coupling of the members 10 and 22 by affording means of indexing these members, as hereinafter described.

In applying my novel device, the pipe 32 is connected to the valve 4, which is then opened to permit insertion of the plug assembly into the pipe line 2. After the plug assembly has been inserted to the desired point in the pipe line beyond the leak therein which may occur, for example, at the connection of said line to the valve, the rod is preferably held against rotation by the handle 40, and the rotor tube is rotated by the handle 38, thus tightening the compressor nut 13 against the plug 16 to expand it against the inner surface of the pipe line and positively preventing passage of fluid therethrough past the plug assembly. The tube is then retracted by means of the handle 38, against the resistance of the spring 42, to a point at which the bayonet connection between the coupling members 10 and 22 is released, thus permitting retraction of the tube 26 and the rod 20 through the valve 4. The pipe 32 may then be disconnected from the valve after the same has been closed. When the desired repairs have been made, the pipe 32 may again be connected to the valve, and the rod 20 and tube 26 may be inserted therethrough, with the tube maintained manually in retracted position relative to the rod member 22, thus compressing the spring 42.

The loop 46 affords external visual indication of the relative rotational position of the member 22, so that it may be reinserted to the position from which it was retracted and thus may be indexed with the coupling member 10 and interlocked therewith. The tube 26 may then be released, permitting the spring 42 to urge said tube into sleeved relationship over the coupling members, thus maintaining the tongue and groove connection therebetween. The plug 16 may now be contracted by rotating the tube 26 and the nut 13, and the plug assembly may be retracted into the pipe 32 to permit closing of the valve 4, after which the pipe 32 may be removed.

It may be noted that the outer end of the coupling member 10 may be provided with a beveled cam surface 48 engageable with the tube to facilitate its movement into sleeved relationship over said member 10, and likewise the inner and outer ends of the lugs 12 and 23 may be respectively beveled at 50 and 52 (Fig. 2) to facilitate coupling of the members 10 and 22.

It is to be understood that I do not wish to be limited by the exact embodiment of the device shown which is merely by way of illustration and not limitation, as various and other forms of the device will, of course, be apparent to those skilled in the art, without departing from the spirit of the invention or the scope of the claims.

I claim:

1. In a blockade device for a pipe, a plug assembly adapted to be entirely disposed within said pipe and comprising a rod with an abutment member on one end thereof and coupling means on the opposite end thereof including a coupling portion with a lug on the outer extremity thereof defining a transverse recess therein spaced inwardly of said extremity, a compressor nut in threaded engagement with said rod intermediate its ends, an expansible, resilient plug snugly sleeved on said rod between said nut and said abutment member, and a readily engageable and disengageable actuating mechanism for said assembly comprising a rotor tube in complementary tongue and groove engagement at the inner extremity thereof with the outer extremity of said nut, a nonrotatable member sleeved within said tube, said nonrotatable member having coupling means on its inner end comprising a coupling portion with a lug on its inner extremity received within said recess, the lug on each of said coupling portions presenting a substantially flat bearing surface in abutment with a complementary flat surface on the other coupling portion, the clearance of said coupling portions from the inner surface of said tube being less than the depth of said recess, whereby said coupling portions are maintained in interlocked relationship with each other when said tube is sleeved thereover, a handle on said tube for rotating the same, and a handle on said nonrotatable member for holding it against rotation.

2. A blockade device according to claim 1, wherein the first-mentioned coupling portion is provided on the outer extremity thereof with a beveled cam surface for engagement with the rotor tube as the latter is moved into sleeved relationship with said first-mentioned coupling portion.

3. A blockade device according to claim 1, wherein resilient means is sleeved over said nonrotatable member for engagement with abutment means thereon and abutment means carried by said tube, to resist retraction of said tube from its sleeved relationship over said coupling portions.

4. A blockade device according to claim 1, wherein said nonrotatable member is provided with index means affording external, visual indication of the position of said second-mentioned coupling portion within said pipe.

5. In a stopper device for a conduit, a plug assembly adapted to be entirely disposed therewithin, said assembly comprising a rod, an expansible resilient plug sleeved thereover, spaced abutment members carried by said rod at opposite ends of said plug, one of said members being in threaded engagement with said rod, a rotor tube in complementary tongue and groove engagement at one end thereof with the adjacent extremity of the last-mentioned member, said tube being retractible from said engagement, a nonrotatable member sleeved within said tube in complementary tongue and groove engagement with one side of said rod, at the adjacent extremity thereof, the inner diameter of said tube being such that said nonrotatable member and the engaging portion of said rod are prevented from becoming disengaged from each other while said tube is sleeved thereover, means for rotating said tube, and means for holding said nonrotatable member against rotation.

6. A stopper device according to claim 5, wherein said rod is provided, on the opposite side thereof at the outer extremity thereof, with a beveled cam surface for engagement with said tube as the latter is moved toward said abutment members.

7. In a stopper device for a conduit, a plug assembly adapted to be entirely disposed therewithin, said assembly comprising a rod, a resilient plug snugly sleeved thereover, spaced abutment members carried by said rod at opposite ends of said plug, one of said members being in threaded engagement with said rod, a tube element in complementary tongue and groove engagement at one end thereof with the adjacent extremity of one of said members, an element sleeved within said tube element in complementary tongue and groove engagement with a side of said rod, said tube element being operable to prevent said second-mentioned element and the associated portion of said rod from becoming disengaged from each other while said tube element is sleeved thereover, and said tube element being retractible from engagement with the last-mentioned of said members to a point whereat said second-mentioned element may be disengaged from said rod, means for rotating one of said elements, and means for holding the other element against rotation.

8. In a stopper device for a conduit, a plug assembly adapted to be entirely disposed therewithin and comprising a rod with an expansible resilient plug sleeved thereon, an abutment for one end of said plug carried by said rod and fixed against axial movement with respect thereto, a compressor nut threaded on said rod, a tube member in interlocking engagement with said nut, a member sleeved within said tube member and having a tongue at one end thereof defining a groove spaced from said end thereof, a tongue on said rod positioned within said groove, said second-mentioned member being retained in tongue and groove engagement with said rod by said tube member, said tube member being retractible axially thereof from engagement with said nut to a point at which said second-mentioned member may be disengaged from said rod, means for rotating one of said members, and means for preventing rotation of the other member.

9. A stopper device according to claim 8, wherein resilient means is provided for resisting said retraction of said tube member.

10. A stopper device according to claim 8, wherein said rod comprises a cam surface engageable with said tube member as the latter is moved toward said nut for engagement therewith.

11. In a stopper device, a plug mechanism comprising a rod carrying spaced abutments, at least one of which is threaded on the rod, a resilient plug disposed between said abutments for compression therebetween, a member interlocked with said rod, means for maintaining said member in interlocked relationship with said rod comprising a tubular member sleeved over the first-mentioned member and adapted for interlocking engagement with one of said abutments, said tubular member being retractible from said interlocking engagement, whereby said first-mentioned member may be disengaged from said rod, and means for rotating at least one of said members relative to the other thereof.

12. In a stopper device for a conduit, a plug assembly adapted to be entirely disposed therewithin and comprising a rod member including an abutment fixed with respect thereto, a nut member spaced from said abutment and threaded on said rod member, and an expansible resilient plug sleeved on said rod member between said abutment and said nut member, and a readily engageable and disengageable actuating mechanism associated with said assembly and comprising an element having a tongue and groove connection with said rod member, a tube element sleeved over the first-mentioned element for maintaining it in said connection with said rod member, said tube element being in complementary interlocking engagement with said nut member and being retractible from said engagement to release said first-mentioned element from its connection with said rod member, and manually operated means for rotating one of said elements relative to the other thereof.

13. In a plug assembly for a conduit or the like, a rod, an abutment carried thereby adjacent one extremity thereof, a coupling portion on the opposite extremity of said rod having tongue and groove interlocking means on one side thereof, a compressor nut threaded on said rod intermediate its extremities, said nut having engaging means on the end thereof adjacent said first-mentioned means, and an expansible resilient member carried by said rod between said abutment and said nut.

14. In a stopper device, a plug mechanism comprising a rod, an abutment carried thereby, a spaced abutment threaded on the rod, a resilient plug between said abutments, and actuating means for said mechanism comprising a member operatively engaged with the rod, a member sleeved over the first-mentioned member and operatively engaged with one of the abutments, means for rotating one of said members relatively to the other, and resilient means reacting against respective members for yieldingly maintaining said second-mentioned member in engagement with the associated abutment.

15. In a stopper device for a conduit, a plug assembly adapted to be entirely disposed therewithin, said assembly comprising a rod, a resilient plug sleeved thereon, spaced abutment members on said rod at opposite ends of said plug, one of said members being in threaded engagement with said rod, and a readily engageable and disengageable actuating mechanism for said assembly comprising a tube element having interlocking means, interlocking means on one of said members in complementary interlocking engagement with said first-mentioned means, said interlocking means being formed and arranged to prevent relative rotational movement between said last-mentioned member and said tube element and to permit relative movement therebetween axially of the tube element in the direction away from said last-mentioned member, and an element sleeved within said tube element and comprising engaging means, engaging means on said rod in complementary interlocking engagement with first-mentioned engaging means, said engaging means being formed and arranged to interlock said rod and said second-mentioned element against relative rotational movement or relative movement therebetween axially of the tube element when the latter is sleeved over said engaging means, means for rotating one of said elements, and means for restraining the other of said elements against rotation.

16. In a plug assembly for a conduit and the like, a rod, an abutment carried thereby at one extremity thereof, a coupling portion on the opposite extremity of said rod having tongue and groove interlocking means on one side thereof, a compressor nut threaded on said rod intermediate its extremities, said nut having interlocking means on the end thereof adjacent said first-mentioned means, an expansible resilient plug sleeved on said rod between said abutment and said nut, and a beveled cam surface on the opposite side of said coupling portion at the extremity thereof remote from said nut.

17. In a stopper device, a plug mechanism comprising a rod, an abutment carried thereby, a spaced abutment threaded on the rod, a resilient plug between said abutments, and actuating means for said mechanism comprising a member operatively engaged with the rod, a member sleeved over the first-mentioned member and operatively engaged with one of the abutments, means for rotating one of said members relative to the other, and means engageable with respective members for positively maintaining said second-mentioned member in engagement with the associated abutment.

18. In a stopper device, a rod, spaced abutments carried thereby, at least one of said abutments being threaded on said rod, an expansible resilient unit between said abutments, a member having a loose tongue and groove connection with said rod, means for retaining said member in said connection comprising another member sleeved over the first-mentioned member in loose tongue and groove engagement with one of said abutments, said second-mentioned member being retractible from said engagement, and means for rotating at least one of said members relative to the other thereof.

19. In a stopper device, a plug assembly including a rod carrying an abutment, a spaced abutment threaded on said rod, an expansible resilient plug sleeved on said rod intermediate said abutments, a member having a tongue and groove connection with said rod, means for retaining said member in said connection comprising a tube member sleeved over said first-mentioned member in interlocking engagement with one of said abutments, said tube member being retractible from said interlocking engagement, and means for rotating at least one of said members relative to the other thereof.

MICHAEL RACZ.